United States Patent
Han (10) Patent No.: US 9,904,419 B2
(45) Date of Patent: Feb. 27, 2018

(54) CAPACITIVE SENSOR ACTION IN RESPONSE TO PROXIMITY SENSOR DATA

(71) Applicant: Intel Corporation, Santa Clara, CA (US)

(72) Inventor: Xu Han, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 14/426,100

(22) PCT Filed: Mar. 26, 2014

(86) PCT No.: PCT/CN2014/074078
§ 371 (c)(1),
(2) Date: Mar. 4, 2015

(87) PCT Pub. No.: WO2015/143633
PCT Pub. Date: Oct. 1, 2015

(65) Prior Publication Data
US 2016/0246401 A1    Aug. 25, 2016

(51) Int. Cl.
*G06F 3/044* (2006.01)
*G06F 1/32* (2006.01)
*G06F 3/041* (2006.01)
*G06F 3/046* (2006.01)

(52) U.S. Cl.
CPC ............ *G06F 3/044* (2013.01); *G06F 1/3231* (2013.01); *G06F 3/046* (2013.01); *G06F 3/0414* (2013.01); *G06F 3/0416* (2013.01); *G06F 3/0418* (2013.01); *G06F 1/3262* (2013.01); *G06F 2203/04105* (2013.01); *Y02B 60/1289* (2013.01)

(58) Field of Classification Search
None
See application file for complete search history.

(56) References Cited

U.S. PATENT DOCUMENTS

| 8,942,951 | B2 * | 1/2015 | Moussavi | G06F 3/043 345/173 |
| 2013/0181941 | A1 * | 7/2013 | Okuno | G06F 3/041 345/174 |
| 2013/0207925 | A1 | 8/2013 | Ryshtun et al. | |
| 2015/0237183 | A1 * | 8/2015 | Novet | H04M 1/72569 455/556.1 |

FOREIGN PATENT DOCUMENTS

| CN | 101552818 A | 10/2009 |
| CN | 101820466 A | 9/2010 |
| JP | 2012118850 A | 6/2012 |
| KR | 20130007789 A | 1/2013 |
| TW | 201351243 A | 12/2013 |

OTHER PUBLICATIONS

Taiwan IPO Search Report, TW Application No. 1014104564, date of completion Jun. 13, 2016, 2 pages.

* cited by examiner

*Primary Examiner* — Kenneth B Lee, Jr.
(74) *Attorney, Agent, or Firm* — International IP Law Group, P.L.L.C.

(57) ABSTRACT

Techniques for performing a capacitive sensor action are described herein. Data may be received from a proximity sensor of a computing device. The proximity data may indicate potential capacitive interaction of an electrically charged object with a capacitive sensor of a touch panel of the computing device. An action may be performed at the capacitive sensor in response to the proximity sensor data.

20 Claims, 7 Drawing Sheets

CAPACITIVE SENSOR ACTION IN RESPONSE TO PROXIMITY SENSOR DATA

CROSS REFERENCE TO RELATED APPLICATIONS

Pursuant to 35 U.S.C. § 371, this application is the United States National Stage Application of International Patent Application No. PCT/CN2014/074078, filed on Mar. 26, 2014, the contents of which are incorporated by reference as if set forth in their entirety herein.

TECHNICAL FIELD

This disclosure relates generally to capacitive sensors. More specifically, the disclosure describes capacitive sensor actions performed in response to detection of proximity sensor data.

BACKGROUND

Computing devices may include components responsive to physical interaction, such as a touch panel, of a computing device. A touch panel may incorporate capacitive sensors. Capacitive sensors may detect changes in capacitance in an electrical conductor of the touch panel due to interactions of an electrically charged object, such as a human finger, with an electrostatic field of the electrical conductor. In some scenarios, a touch panel, such as a touch screen, may need to periodically calibrate the capacitive sensors. When a charged object, such as a hand is touching the touch panel during the time of calibration, the area touched by the hand may become non-functional after the calibration. The non-functionality may occur as a result of the calibration incorrectly setting a higher capacitance to the area touched by the hand as a baseline due to the hand being placed on the area and creating a higher capacitance at the area during calibration than would otherwise occur.

DETAILED DESCRIPTION

The subject matter disclosed herein relates to techniques for performing actions at a capacitive sensor in response to receiving data from a proximity sensor indicating potential capacitive interaction with the capacitive sensor. As discussed above, a capacitive touch panel may periodically require calibration. During calibration, a baseline capacitance is determined. However, if an electrically charged external object interacts with a capacitive sensor of the touch panel during calibration, an inaccurate baseline may occur. An electrically charged object may include a body part of a user, a stylus configured to hold an electric charge, and the like. The embodiments described herein include a proximity sensor configured to detect the presence of an object that may potentially interact with capacitive sensor. Actions are taken at the capacitive sensor including delaying the calibration if such an object is detected.

In some cases, a capacitive sensor may consume relatively high amounts of power, in relation to a proximity sensor. Therefore, in further embodiments described herein, the proximity sensor may be used to wake up the capacitive sensor when a potential capacitive interaction is detected by the proximity sensor.

Figure 1:
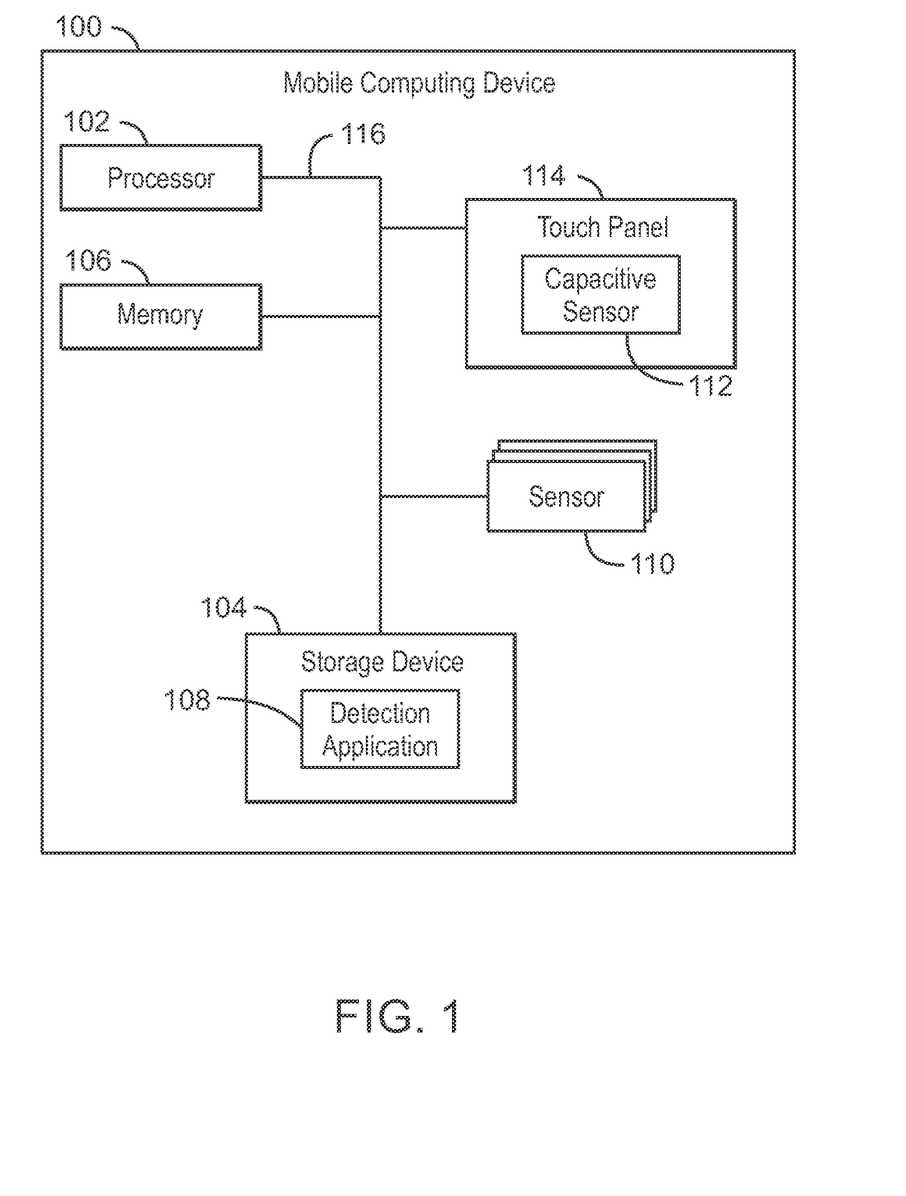
FIG. 1 is a block diagram of a computing device having logic to perform actions at a capacitive sensor.

FIG. 1 is a block diagram of a computing device having logic to estimate ambient temperature. The computing device 100 may include a processor 102, a storage device 104 comprising a non-transitory computer-readable medium, and a memory device 106. The computing device 100 may include a detection application 108 configured to receive data from a proximity sensor 110.

The detection application 108 may be logic, at least partially comprising hardware logic. In some embodiments, the detection application 108 is a set of instructions stored on the storage device 104, that when executed by the processor 102, direct the computing device 100 to perform operations including receiving data from the proximity sensor 110 of the computing device 100 indicating potential capacitive interaction of an electrically charged object with a capacitive sensor 112 of a touch panel 114 of the computing device 100. The operations include performing an action at the capacitive sensor 112 in response to the proximity sensor 110 data.

The proximity sensor 110 may be one of several various types of sensors detecting a presence of an object near the touch panel 114 of the computing device 100. For example, the proximity sensor 110 may be an infrared proximity sensor configured to emit an electromagnetic field and detect changes in the electromagnetic field when an object disrupts the electromagnetic field, as discussed in more detail below in regard to FIG. 4. As another example, the proximity sensor 110 may be a pressure sensor configured to detect when a user applies pressure to the touch panel 114, as discussed in more detail below in regard to FIG. 5. In any embodiment, the proximity sensor 110 is configured to detect a presence of a potentially charged object that may interact with the capacitive sensor 112.

The touch panel 114 may be portion of the computing device 100 configured to enable a user to interact with the computing device 100 through gestures performed at the touch panel 114. The touch panel 114 may be an integrated component of the computing device 100, or an external component of the computing device 100. In one example, the touch panel is a touch screen display device. In another example, the touch panel is a touch pad. The capacitive sensor 112 consists of an insulator, such as a panel of glass, coated by a conductive element, such as indium tin oxide. As an object having an electric charge, such as a human hand, touches the surface of the touch panel 114, distortions in an electrostatic field are measurable as a change in capacitance by the capacitive sensor 112.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (RAM), such as static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), flash memory, or any other suitable memory systems. The main processor 102 may be connected through a system bus 116 (e.g., Peripheral Component Interconnect (PCI), Industry Standard Architecture (ISA), PCI-Express, HyperTransport®, NuBus, etc.) to components including the memory 106, the storage device 104, the sensors 110, 112, the touch panel 114, and the like.

The block diagram of FIG. 1 is not intended to indicate that the computing device 100 is to include all of the components shown in FIG. 1. The computing device 100 may include any number of additional components not shown in FIG. 1, depending on the details of the specific implementation. Further, the arrangement of various components illustrated in FIG. 1 is not necessarily representative of an arrangement of the present techniques.

Figure 2:
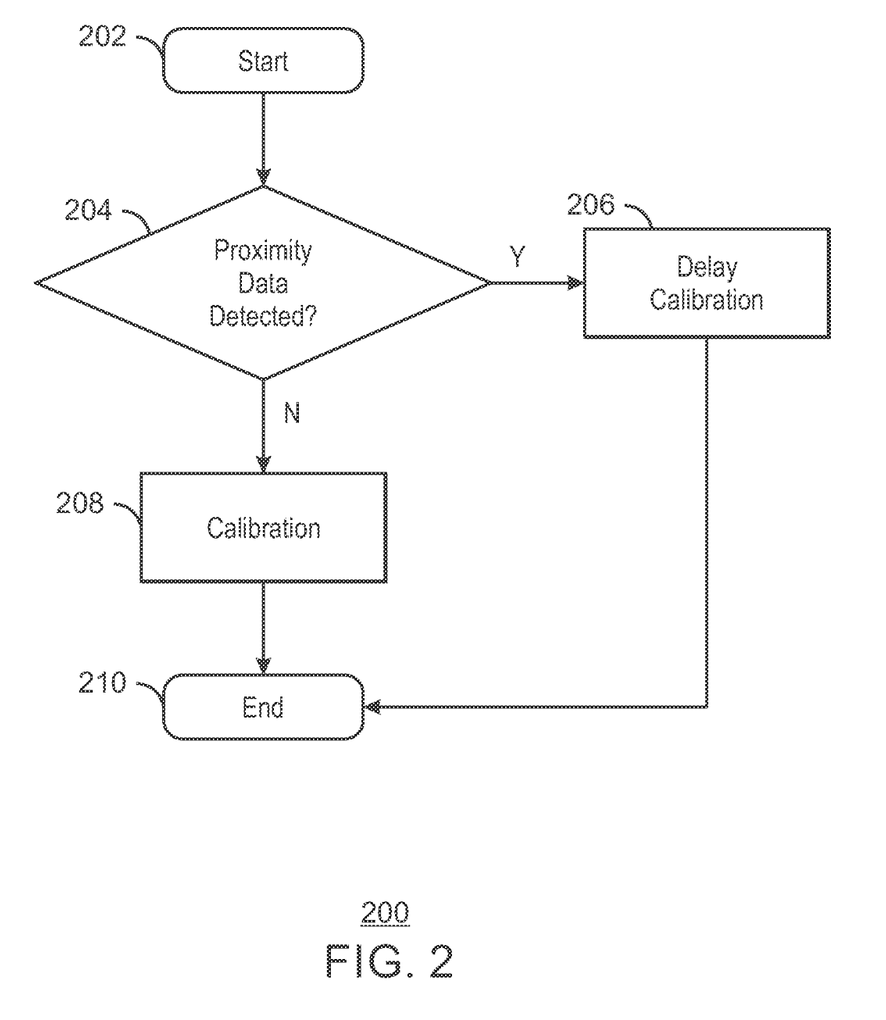
FIG. 2 is a flow diagram illustrating a delay in calibration at a capacitive sensor based on a proximity sensor detection.

FIG. 2 is a flow diagram illustrating a delay in calibration at a capacitive sensor based on proximity sensor detection. As discussed above, the techniques described herein include a proximity sensor, such as the proximity sensor 110 of FIG. 1, configured to detect the presence of an object that may potentially interact with capacitive sensor 112, and delay the calibration if such an object is detected. At block 202, a process 200 is initiated for calibration of the capacitive sensor 112. At 204, the process 200 determines whether proximity data is detected indicating a potential interaction of an electrically charged object with the capacitive sensor 112. If proximity data indicating a potential interaction of the object with the capacitive sensor is detected, then, at block 206, the calibration is delayed. For example, if a user's hand is touching the touch panel 114, the calibration will not proceed. If proximity data is not detected, or does not indicate a potential capacitive interaction of an electrically charged object with the capacitive sensor 112, the calibration proceeds at 208, and the process ends at 210.

In embodiments, the calibration is delayed until a next scheduled calibration. In some embodiments, the calibration may be delayed only until the proximity data does not indicate a potential capacitive interaction of an electrically charged object with the capacitive sensor 112. For example, a calibration may be delayed until a hand is removed from the touch panel 114.

Figure 3:
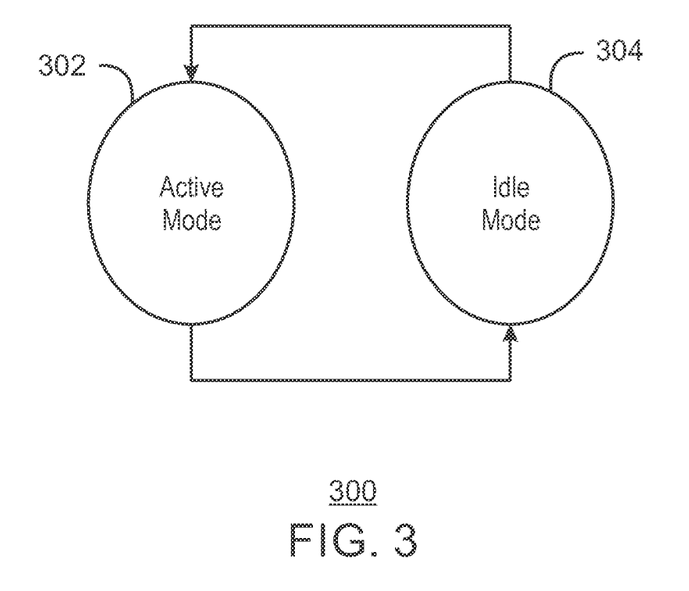
FIG. 3 is a flow diagram illustrating a wake up performed at a capacitive sensor based on proximity sensor detection.

FIG. 3 is a flow diagram illustrating a wake up performed at a capacitive sensor based on proximity sensor detection. As discussed above, in embodiments described herein, the proximity sensor 110 may be used to wake up the capacitive sensor 112 when a potentially capacitive interaction is detected by the proximity sensor 110. The capacitive sensor 112 may be configured to operate in an active mode, at 302. In active mode, the capacitive sensor 112 continuously monitors for changes in capacitance. However, continuous monitoring for changes in capacitance may consume unnecessary power. The embodiments described herein include an idle mode, indicated at 304. In idle mode 304, the capacitive sensor 112 may be configured to discontinue monitoring for any change in capacitance, while the proximity sensor 110 may continue to monitor for any potential capacitive interaction of an electrically charged object with the capacitive sensor 112. For example, if during an idle mode, the proximity sensor 110 detects a user's finger at the touch panel 114, logic, such as the detection application 108 of FIG. 1, may wake up the capacitive sensor 112 to operate in active mode 302.

Figure 4:
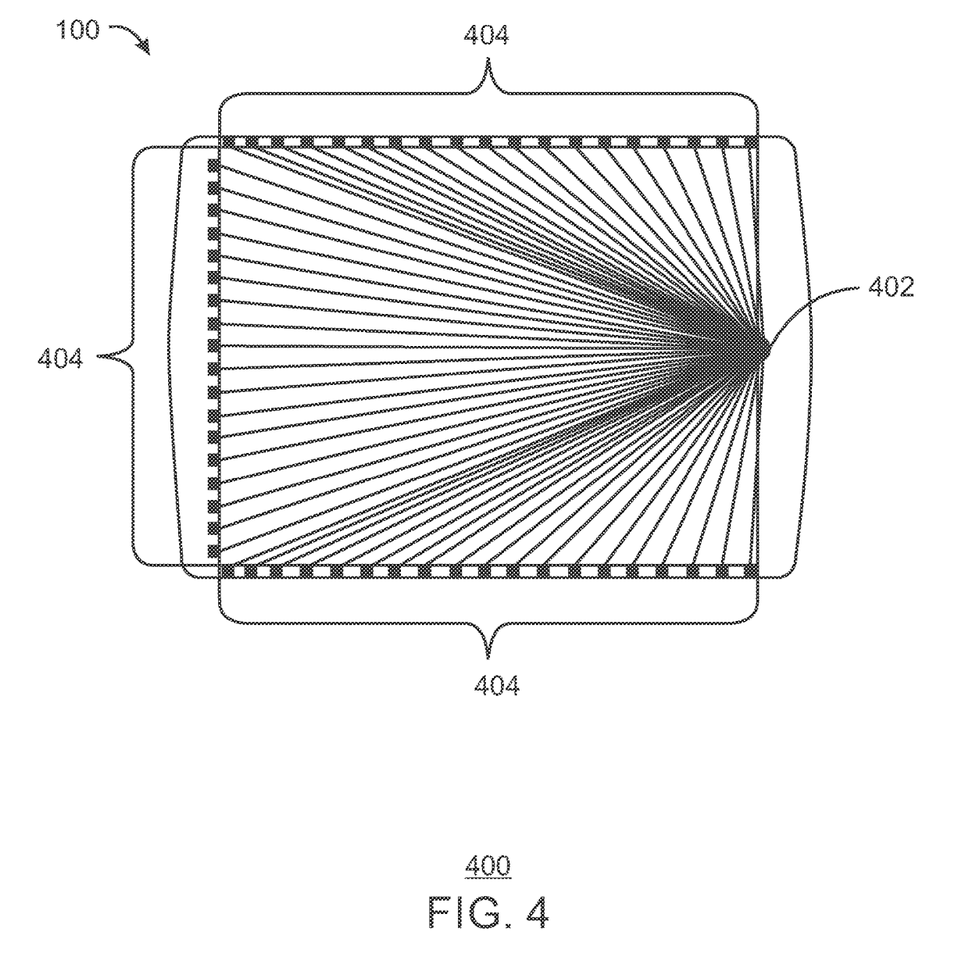
FIG. 4 is a diagram illustrating an example computing device having an infrared sensor to detect presence of an object.

FIG. 4 is a diagram illustrating an example computing device having an infrared sensor to detect presence of an object. As discussed above, the proximity sensor 110 may be an infrared sensor. The infrared sensor may include an emitter 402, and a plurality of detectors, indicated at the brackets 404. In embodiments, the emitter 402 may emit beams of electromagnetic radiation in the infrared spectrum that are received by the detectors 404. In some cases, the infrared beams may propagate through a material, such as glass or plastic of a touch screen display device. A change in the electromagnetic radiation received by one or more of the detectors 404 may indicate the presence of a potentially charged object. In this scenario, an action may be performed at a capacitive sensor, such as the capacitive sensor 112 of FIG. 1. For example, if the presence of a potentially charged object is detected during a calibration process, the calibration may be terminated, or delayed. As another example, if the capacitive sensor 112 is in an idle mode, the detection of a potentially charged object by the proximity sensor 110 may trigger initializing the capacitive sensor 112 into an active mode.

Figure 5:
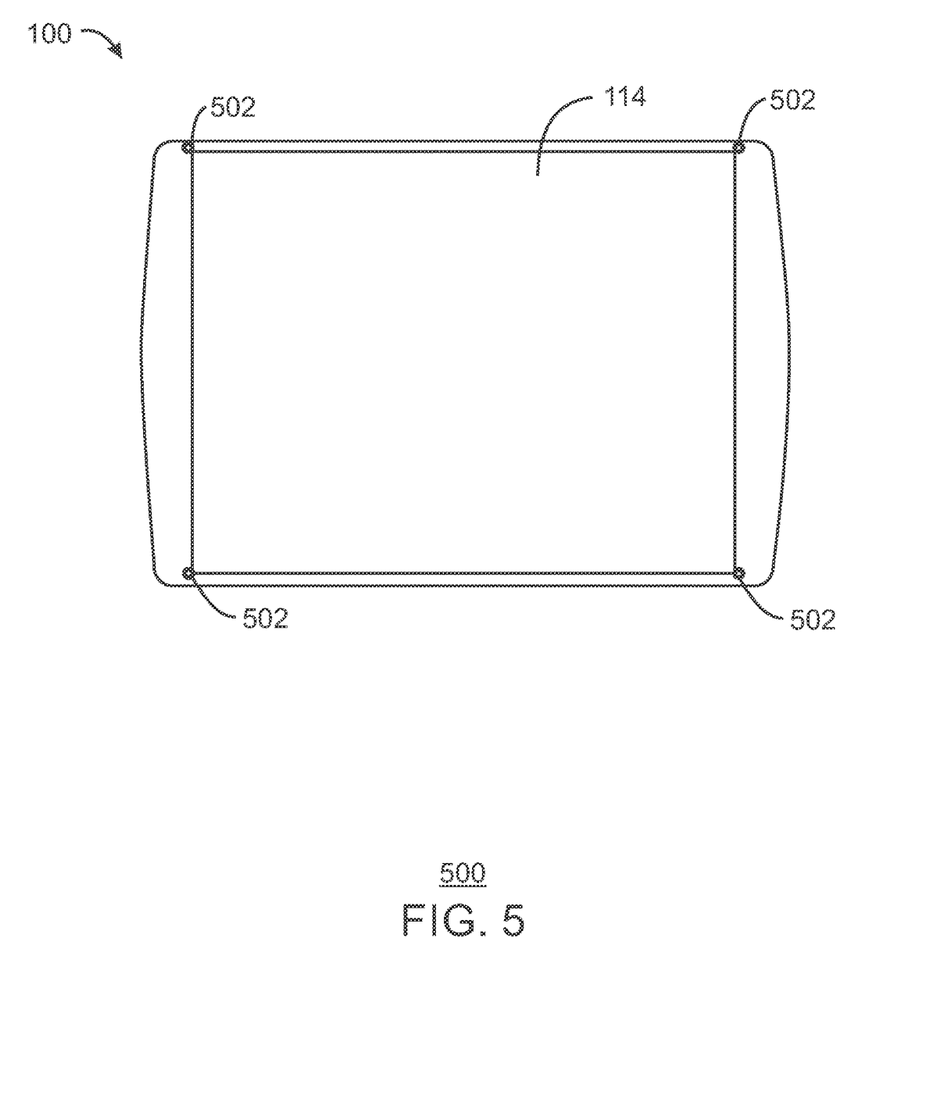
FIG. 5 is a diagram illustrating an example computing device having pressure sensors to detect pressure applied to a touch screen of the computing device.

FIG. 5 is a diagram illustrating an example computing device having pressure sensors to detect pressure applied to a touch screen of the computing device. As discussed above in regard to FIG. 1, the proximity sensor may be implemented as one or more pressure sensors 502. As illustrated in FIG. 5, the touch panel 114 may be implemented as a touch screen of the computing device 100. As a user presses on the touch panel 114, the pressure sensors 502 may detect changes in pressure indicating a potentially charged object interacting with the touch screen. As discussed above in regard to FIG. 4, an action may be performed at a capacitive sensor, such as the capacitive sensor 112 of FIG. 1, in response to proximity sensor data, such as data indicating pressure changes detected by the pressure sensors 502. In one example of an action that may be performed, if the pressure is detected during a calibration process, the calibration may be terminated, or delayed. As another example, if the capacitive sensor 112 is in an idle mode, the detection of pressure by the pressure sensors 502 may trigger initializing the capacitive sensor into an active mode.

Figure 6:
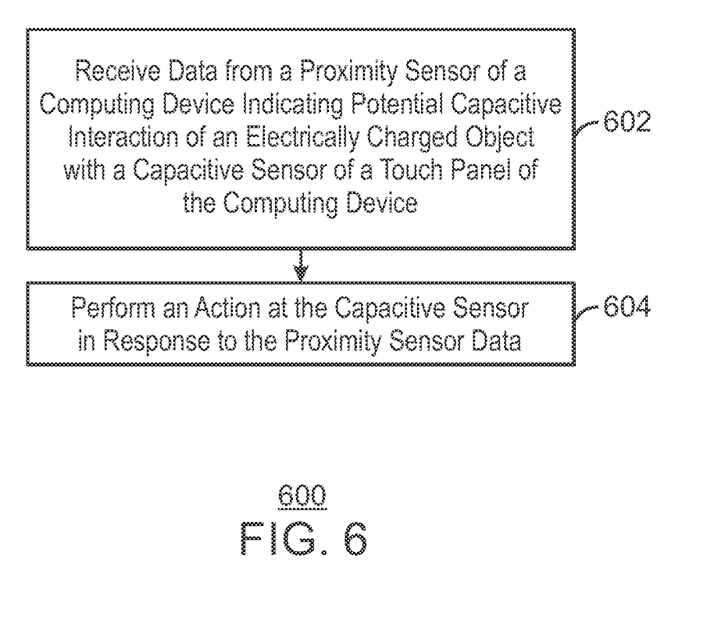
FIG. 6 is a block diagram illustrating a method of performing actions at a capacitive sensor in response to receiving data indicating potential capacitive interaction of an electrically charged object with a capacitive sensor of a touch panel of the computing device.

FIG. 6 is a block diagram illustrating a method of performing actions at a capacitive sensor in response to receiving data indicating potential capacitive interaction of an electrically charged object with a capacitive sensor of a touch panel of the computing device. At block 602, data is received from a proximity sensor of a computing device indicating potential capacitive interaction of an electrically charged object with a capacitive sensor of a touch panel of the computing device. At block 604, an action is performed at the capacitive sensor in response to the proximity sensor data.

In embodiments, the action implemented at 602 includes terminating, or delaying, a calibration of the capacitive sensor. In some cases, the delay may last until the proximity sensor data indicates that there is no potential capacitive interaction with an electrically charged object such that the calibration may be performed in an accurate manner. In other cases, the delay extends for a predetermined period. For example, the computing device may be configured to calibrate the capacitive sensor at predetermined intervals. In this scenario, the delay would extend until the next interval.

In some scenarios, the capacitive sensor may be inactive prior to the receiving of proximity sensor data. In this scenario, the action includes waking up the capacitive sensor in response to receiving the proximity sensor data.

Figure 7:
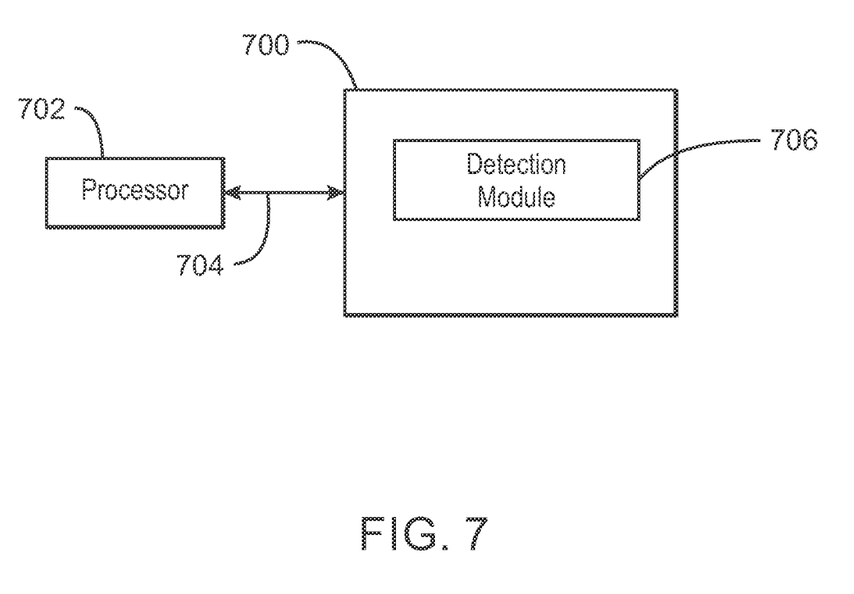
FIG. 7 is a block diagram depicting an example of a tangible, non-transitory computer-readable medium configured to perform an action at a capacitive in response to data indicating potential capacitive interaction of an electrically charged object with a capacitive sensor of a touch panel of the computing device.

FIG. 7 is a block diagram depicting an example of a tangible, non-transitory computer-readable medium configured to perform an action at a capacitive in response to data indicating potential capacitive interaction of an electrically charged object with a capacitive sensor of a touch panel of the computing device.

The tangible, non-transitory, computer-readable medium 700 may be accessed by a processor 702 over a computer bus 704. Furthermore, the tangible, non-transitory, computer-readable medium 700 may include computer-executable instructions to direct the processor 702 to perform the steps of the current method.

The various software components discussed herein may be stored on the tangible, non-transitory, computer-readable medium 700, as indicated in FIG. 7. For example, a power monitoring module 706 may be configured to receive data from a proximity sensor of a computing device indicating potential capacitive interaction of an electrically charged object with a capacitive sensor of a touch panel of the computing device, and perform an action at the capacitive sensor in response to the proximity sensor data.

Example 1

A method for performing actions based on proximity data is described herein. The method includes receiving data from a proximity sensor of a computing device indicating potential capacitive interaction of an electrically charged object with a capacitive sensor of a touch panel of the computing device. The method further includes performing an action at the capacitive sensor in response to the proximity sensor data.

Example 2

A computing device for performing actions based on proximity data is described herein. The computing device includes a proximity sensor and a capacitive sensor. The computing device also includes logic, at least partially including hardware logic, such as an electronic circuit, that is to receive data from a proximity sensor of a computing device indicating potential capacitive interaction of an electrically charged object with a capacitive sensor of a touch panel of the computing device. The logic is also configured to perform an action at the capacitive sensor in response to the proximity sensor data.

Example 3

A non-transitory computer readable medium for performing actions based on proximity data is described herein. The computer readable medium includes codes, executable by a processing device. When executed, the code may cause the processing device to receive data from a proximity sensor of a computing device indicating potential capacitive interaction of an electrically charged object with a capacitive sensor of a touch panel of the computing device. The code may cause the processing device to perform an action at the capacitive sensor in response to the proximity sensor data.

Example 4

A means for performing an action based on proximity data is described herein. The means for performing an action based on proximity data includes a proximity sensor and a capacitive sensor. The means for performing an action based on proximity data also includes logic, at least partially including hardware logic, such as an electronic circuit, that is to receive data from a proximity sensor of a computing device indicating potential capacitive interaction of an electrically charged object with a capacitive sensor of a touch panel of the computing device. The logic is also configured to perform an action at the capacitive sensor in response to the proximity sensor data.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method, comprising
receiving data from a proximity sensor of a computing device indicating potential capacitive interaction of an electrically charged object with a capacitive sensor of a touch panel of the computing device; and
performing an action at the capacitive sensor in response to the proximity sensor data, and in response to data from the proximity sensor wake up the capacitive sensor to perform the action in an active mode, and in response to the potential capacitive interaction delay a calibration via the capacitive sensor.

2. The method of claim 1, the action comprising delaying calibration of the capacitive sensor of the touch panel in response to receiving the proximity sensor data.

3. The method of claim 2, wherein calibration is delayed for a period of time, the period of time comprising:
a predetermined period;
a period extending as long as the proximity sensor data indicating potential capacitive interaction persists; and
any combination thereof.

4. The method of claim 1, wherein the capacitive sensor is inactive prior to the receiving the proximity sensor data, the action comprising waking up the capacitive sensor in response to receiving the proximity sensor data.

5. The method of claim 1, wherein the electrically charged object comprises:
a body part;
a stylus; or
any combination thereof.

6. The method of claim 1, wherein the proximity sensor comprises:
an infrared sensor;
a pressure sensor; or
any combination thereof.

7. The method of claim 6, wherein the proximity sensor is an infrared sensor comprising:
an infrared emitter; and
a plurality of detectors disposed along a periphery of the touch panel.

8. A computing device, comprising
a proximity sensor;
a capacitive sensor;
logic, at least partially comprising hardware logic, to:
receive data from the proximity sensor indicating potential capacitive interaction of an electrically charged object with a capacitive sensor of a touch panel of the computing device; and
perform an action at the capacitive sensor and continuously monitor for changes in capacitance in response to the proximity sensor data, wherein the proximity sensor is to wake up the capacitive sensor to perform the action in an active mode, and in response to the potential capacitive interaction delay a calibration via the capacitive sensor.

9. The computing device of claim 8, the action comprising delaying calibration of the capacitive sensor of the touch panel in response to receiving the proximity sensor data.

10. The computing device of claim 9, wherein calibration is delayed for a period of time, the period of time comprising:
a predetermined period;
a period extending as long as the proximity sensor data indicating potential capacitive interaction persists; and
any combination thereof.

11. The computing device of claim 8, wherein the capacitive sensor is inactive prior to the receiving the proximity sensor data, the action comprising waking up the capacitive sensor in response to receiving the proximity sensor data.

12. The computing device of claim 8, wherein the electrically charged object comprises:
a body part;
a stylus; or
any combination thereof.

13. The computing device of claim 8, wherein the proximity sensor comprises:
an infrared sensor;
a pressure sensor; or
any combination thereof.

14. The computing device of claim 13, wherein the proximity sensor is an infrared sensor comprising:
an infrared emitter; and
a plurality of detectors disposed along a periphery of the touch panel.

15. A non-transitory computer readable medium including code, when executed, to cause a processing device to carry out operations, the operations comprising:
receiving data from a proximity sensor of a computing device indicating potential capacitive interaction of an electrically charged object with a capacitive sensor of a touch panel of the computing device; and
performing an action at the capacitive sensor in response to the proximity sensor data, wherein the proximity sensor is to wake up the capacitive sensor to perform the action in an active mode, and in response to the potential capacitive interaction delay a calibration via the capacitive sensor.

16. The computer readable medium of claim 15, the action comprising:
delaying calibration of the capacitive sensor of the touch panel in response to receiving the proximity sensor data; or
the action comprising waking up the capacitive sensor in response to receiving the proximity sensor data; or
any combination thereof.

17. The computer readable medium of claim 16, wherein calibration is delayed for a period of time, the period of time comprising:
a predetermined period;
a period extending as long as the proximity sensor data indicating potential capacitive interaction persists; and
any combination thereof.

18. The computer readable medium of claim 15, wherein the capacitive sensor is inactive prior to the receiving the proximity sensor data, the action comprising waking up the capacitive sensor in response to a determination that an object is within the scan area.

19. The computer readable medium of claim 15, wherein the electrically charged object comprises:
a body part;
a stylus; or
any combination thereof.

20. The computer readable medium of claim 15, wherein the proximity sensor comprises:
- an infrared sensor comprising an infrared emitter and a plurality of detectors disposed along a periphery of the touch panel;
- a pressure sensor; or
- any combination thereof.

\* \* \* \* \*